(12) United States Patent
Mueller

(10) Patent No.: US 10,374,762 B2
(45) Date of Patent: Aug. 6, 2019

(54) USE OF UNDERUTILIZED BANDWIDTH VIA RADIO ACCESS RESOURCE SHARING

(71) Applicant: AT&T INTELLECTUAL PROPERTY I, L.P., Atlanta, GA (US)

(72) Inventor: Julius Mueller, Palo Alto, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 59 days.

(21) Appl. No.: 15/445,688

(22) Filed: Feb. 28, 2017

(65) Prior Publication Data

US 2018/0248663 A1    Aug. 30, 2018

(51) Int. Cl.
| | | |
|---|---|---|
| H04W 4/00 | (2018.01) |
| H04L 5/00 | (2006.01) |
| H04B 7/0452 | (2017.01) |
| H04W 28/08 | (2009.01) |
| H04W 88/02 | (2009.01) |
| H04W 88/08 | (2009.01) |
| H04W 72/12 | (2009.01) |

(52) U.S. Cl.
CPC ......... *H04L 5/0023* (2013.01); *H04B 7/0452* (2013.01); *H04W 28/08* (2013.01); *H04W 72/1263* (2013.01); *H04W 88/02* (2013.01); *H04W 88/08* (2013.01)

(58) Field of Classification Search
CPC ................................................ H04L 5/0023
See application file for complete search history.

(56) References Cited

U.S. PATENT DOCUMENTS

| | | | |
|---|---|---|---|
| 8,170,056 | B2 | 5/2012 | Allen et al. |
| 8,811,363 | B2 * | 8/2014 | Velasco ............... H04L 12/1403 370/338 |
| 8,892,113 | B2 | 11/2014 | Ratasuk et al. |
| 9,100,381 | B2 | 8/2015 | Cai et al. |
| 9,313,766 | B2 | 4/2016 | DiFazio et al. |
| 9,391,915 | B2 | 7/2016 | Saxena et al. |
| 9,516,579 | B1 | 12/2016 | Diner et al. |

(Continued)

OTHER PUBLICATIONS

Leu et al., "On utilization efficiency of backbone bandwidth for a heterogeneous wireless network operator." Wireless Networks 17.7 (2011): 1595-1604. Retrieved on Dec. 19, 2016, 10 pages.

*Primary Examiner* — Guang W Li
(74) *Attorney, Agent, or Firm* — Amin, Turocy & Watson, LLP

(57) ABSTRACT

Utilization of unused bandwidth or underused bandwidth via radio access resource sharing is disclosed. Unused bandwidth for a physical channel between a network device and a MU MIMO access point can be combined with bandwidth from another physical channel into a logical channel. The logical channel can have increased bandwidth over the constituent physical channels. Whereas MU MIMO technology can facilitate concurrent data transfer, a UE can communicate data across the several physical channels of the logical channel concurrently. Moreover, the different access point locations can provide spatial diversity such that the plurality of access points can function as a logical MU MIMO access point employing interference to selectively serve a UE location via the logical channel. Logical channels can also be predicted based on supplementary information that can comprise historical network resource usage and/or utilization data.

20 Claims, 10 Drawing Sheets

(56) References Cited

U.S. PATENT DOCUMENTS

| | | | |
|---|---|---|---|
| 2001/0021197 A1* | 9/2001 | Foore | H04J 3/1682 370/468 |
| 2008/0300890 A1 | 12/2008 | Dawson et al. | |
| 2009/0207735 A1* | 8/2009 | Ben Letaief | H04L 5/0032 370/237 |
| 2012/0307806 A1* | 12/2012 | Agarwal | H04W 72/1242 370/336 |
| 2013/0286941 A1* | 10/2013 | Lee | H04W 28/065 370/328 |
| 2014/0080535 A1 | 3/2014 | Gauvreau et al. | |
| 2014/0342678 A1* | 11/2014 | Khlat | H04L 5/001 455/78 |
| 2015/0063259 A1* | 3/2015 | Gohari | H04W 28/20 370/329 |
| 2015/0124791 A1 | 5/2015 | Mazandarany et al. | |
| 2015/0188800 A1 | 7/2015 | MacDonald et al. | |
| 2015/0195760 A1 | 7/2015 | Sanz et al. | |
| 2015/0229584 A1* | 8/2015 | Okamoto | H04W 28/08 709/226 |
| 2015/0349930 A1* | 12/2015 | Sazawa | H04L 43/0864 370/254 |
| 2016/0021546 A1* | 1/2016 | Cuervo | H04W 48/18 370/254 |
| 2016/0095003 A1* | 3/2016 | Yu | H04W 16/28 370/311 |
| 2016/0142922 A1* | 5/2016 | Chen | H04B 7/0695 375/267 |

* cited by examiner

USE OF UNDERUTILIZED BANDWIDTH VIA RADIO ACCESS RESOURCE SHARING

TECHNICAL FIELD

The disclosed subject matter relates to enabling access to increased bandwidth via sharing of radio access resources between a user equipment (UE) and a network device.

BACKGROUND

Network connectivity is typically associated with costs to provide and operate. Fixed and mobile resources are generally shared in frequency and/or spectrum, are a finite resource, are regulated, can be expensive to purchase and/or operate, and can be associated with physical limitations affecting deployment of resources. Improved efficiency and utilization of network resources can reduce a cost per bit, e.g., reducing the cost associated with operating, use, or deployment of data transport networks. Moreover, efficient use of a finite resource can allow for more users of the pool of resources, e.g., the more optimal the use of the limited resources the more users benefit from the resources and generally the lower the cost per unit use off the resources.

Consumer data network traffic is generally considered to be 'bursty', e.g., consumer data network traffic tends toward short periods of intense use and other period of little use. Where a period of intense use can employ all allocated bandwidth for a communicative link, while a period of little use can have large quantities of unused bandwidth that is provisioned in anticipation of a next burst of use. This unused bandwidth is effectively wasted bandwidth. Moreover, the period of intense use could be limited by the allocated bandwidth, e.g., if more bandwidth was allocated, more data could be moved in the same amount of time during the intense use period. It can be desirable to use the underutilized bandwidth that is otherwise wasted.

DETAILED DESCRIPTION

Figure 1:
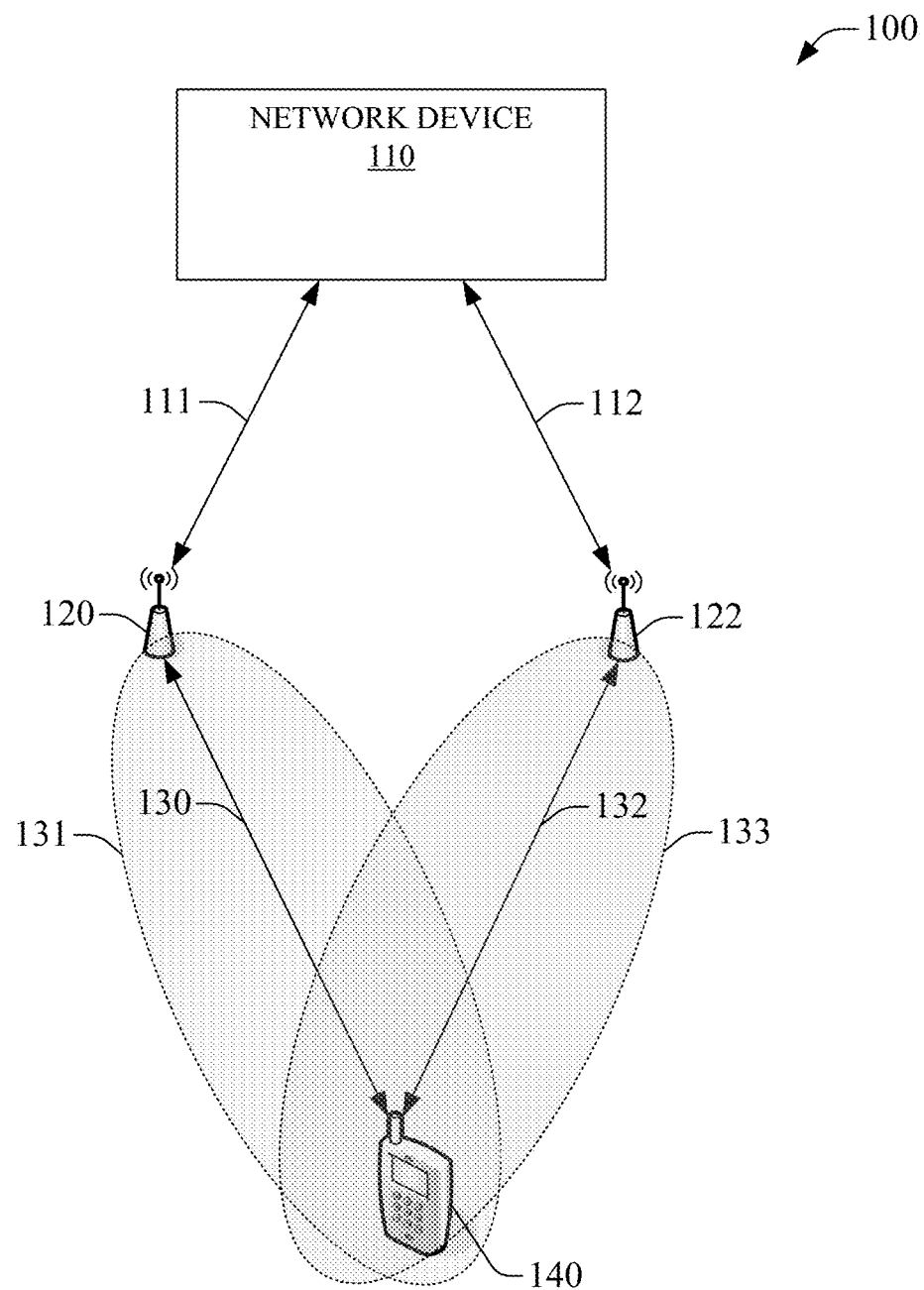
FIG. 1 is an illustration of an example system that can enable redistribution of underutilized bandwidth via radio access resource sharing, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Improved use of network resources can reduce costs and increased access to useable spectrum. Whereas network resources are generally shared in frequency and/or spectrum, are a finite resource, are regulated, are associated with a monetary cost to purchase and/or operate, and are typically associated with physical limitations affecting deployment of resources, improving the efficiency and utilization of the network resources can provide a cost savings by using resources that have already been paid for more efficiently or reducing the need to purchase and/or deploy additional network resources, e.g., reducing the cost associated with operating, use, or deployment of data transport networks. As network resources are used more efficiently, the finite resource can be spread among more users, e.g., bandwidth not allocated to a first user becomes available for allocation to a second user. Whereas network traffic, e.g., consumer data network traffic, etc., is generally can be bursty, a brief period of intense use can employ all allocated bandwidth for a communicative link, which can be followed by a period of low use associated with unused or underused provisioned bandwidth, e.g., provisioned in anticipation of a next bursty use. This allocated but unused/underused bandwidth is effectively wasted bandwidth. Moreover, the period of intense use can be bandwidth limited, e.g., if more bandwidth was allocated, more data could be moved in the same amount of time during the intense use period. It can be desirable to share network resources, e.g., allowing peak usage to increase to the shared bandwidth by reallocating underused spectrum.

To this end, some conventional solutions have included sharing of a link among a plurality of users, e.g., an internet service provider (ISP) can service multiple subscribers on a single connection, effectively causing the subscribers to compete for the resources of the single connection. This solution can better utilize the available resources of the single connection by allocating use to a best competing consumer. Another option can shift a customer to a connection that has a peak bandwidth closer to a predicted burst level, e.g., offload/onboard, etc., for example, a UE can employ a broadband connection when streaming video and be shifted to a 3G connection when accessing email.

In contrast, the instant application discloses employing unused bandwidth to increase the bandwidth of another connection by forming a logical channel comprising a first path between a UE and a first network device via a first access point (AP) and a second path between the UE and a second network device via a second AP, wherein the first AP and the second AP have coverage areas that overlap the location of the UE. In an aspect, an AP can be a multi user (MU) multiple input multiple output (MIMO) (MU MIMO) device, e.g., the first AP can be a first MU MIMO AP device and the second AP can be a second MU MIMO AP device. In another aspect, a MU MIMO AP device can employ nearly any radio access technology (RAT), e.g., cellular, millimeter wave, Wi-Fi™, Bluetooth™, etc., for an over the air link between the UE and the MU MIMO AP device. Similarly, the MU MIMO AP device can use nearly any RAT and/or wired technology for an access link to a network device that bridges to a backhaul link, e.g., a core-network device of a network operator network, such as an access node, digital subscriber line access multiplexer (DSLAM), etc. In a further aspect, a network device can provide control and/or management of the AP device, e.g., via a control plane of the network device. In another aspect, a network device can provide a data plane servicing the AP device, e.g., via a service plane of the network device.

In some embodiments, the disclosed subject matter can employ a network device of a network operator network to control, via a control plane, the flow of data, via a service plane, through a plurality of physical distinct channels configured as a single logical channel, wherein the single logical channel embodies unused portions of previously allocated bandwidth. In these embodiments, the network device can receive first allocation information indicating a first allocation of bandwidth. Moreover, the network device can receive first usage information indicating a first unused portion of first allocated bandwidth. The network device can reallocate the unused bandwidth to a first logical channel comprising a plurality of physical channels to a plurality of MU MIMO APs. The MU MIMO APs can then enable access to the first logical channel for a UE. The UE access to the first logical channel can be via a plurality of wireless links to the plurality of MU MIMO APs. This can be distinct from a UE controlling data flow across a plurality of APs via a plurality of physical channels that are not treated as a logical channel by a network device, in that the network device does not manage network Authentication, Authorization, and Accounting (AAA) in the same way for a single logical channel comprising a pieces of different physical channels as it manages AAA for channels that are both logically and physically distinct. In an aspect, the disclosed subject matter enables bonding of portions of a plurality of access network links into a single logical channel in a novel and nonobvious manner. In an aspect, an uplink channel can be distinct from a downlink channel. Moreover, an uplink and a downlink channel can each be unidirectional. As such, for example, it can be stated that uplink channels and downlink channels between one UEs and any associated MU MIMO APs can be both distinct and unidirectional channels.

In some embodiments, allocation of network resources, e.g., unused bandwidth, into a logical channel can be based on a prediction of bandwidth use. The prediction can be inferred or computed based on supplementary information, e.g., historical bandwidth consumption, historical bandwidth utilization, historical user equipment behaviors, etc. As an example, the occurrence of a sporting event can result in heavier than normal traffic conditions. The heavy traffic can cause employees whose commute home is affected by the traffic to leave their places of work earlier to avoid the traffic. This can result in underused bandwidth, e.g., employees would normally be using the bandwidth at work but are not owing to having left work early to avoid traffic. Similarly, event goers can descend on the stadium at the time of the event and can consume greater than normal bandwidth based on accessing social media pages, texting with friends at the game, posting video shot at the sporting event, or a host of other activities that would not occur but for the occurrence of the sporting event. This historical information can be used to predict bandwidth utilization for a future sporting event, e.g., bandwidth from the corporate APs that are under used can be combined in logical channels to provide greater bandwidth to event goers.

Further, embodiments of the disclosed subject matter can apportion unused bandwidth in a manner that reduces impact on the subscriber to the physical channel that is being shared. Continuing the previous example, where not all employees leave work early to avoid the storing event traffic, the employees remaining at work can still be using the bandwidth on the physical channels, e.g., the bandwidth that the corporation paid for. Accordingly, the network device can monitor the use of physical channels being considered for use in a logical channel. Based on the monitoring results, the physical channel can be shared or not, e.g., where the physical channel is being used in a manner that makes predicting a block of unused spectrum that can be shared, then the physical channel can be excluded from sharing until it is reconsidered at a future time, etc. In another aspect, portions of the physical channels serving the example corporation can be bonded into one, or more, larger logical channel(s) to continue to serve the remaining employees, while another portion of the physical channels service the example corporation are bonded into another logical channel(s) that can serve the increased bandwidth consumed by the sporting event goers.

The use of the MU MIMO APs can enable control of a phased antenna pattern to control areas of maximum constructive interference, e.g., where a signal can be received and areas of maximum destructive interference, e.g., where the signal is not receivable. This can allow the plurality of MU MIMO APs to form wireless links to a UE via phased transmissions from the different MU MIMO APs that allow for simultaneous communication with multiple UEs and to carry data to/from the logical channel between the network device and the MU MIMO APs. In an aspect, the use of MU MIMO enables a transmission on a first MU MIMO AP and a transmission on a second MU MIMO AP to interfere in a predictable manner to allow communication with a UE at a location that is in the service area of both the first and second MU MIMO APs. Spatial diversity between different MU MIMO APs benefits this aspect. This can allow for concurrent transmission of data in multiple streams, wherein the streams can carry data associated with the logical channels comprising unused bandwidth from underutilized physical channels, e.g., creating a phased transmission pattern that can carry data to multiple UEs both independently and simultaneously. This aspect is distinct from the serial sequential transmission of data in a SU MIMO AP.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate redistribution of underutilized bandwidth via radio access resource sharing, in accordance with aspects of the subject disclosure. System 100 can comprise network device 110. Network device 110 can be a network device of a network associated with a network operator, to control, via a control plane, the flow of data, via a service plane, through a plurality of physically distinct channels configured as a single logical channel, wherein the single logical channel embodies unused portions of previously allocated bandwidth. Network device 110 can receive allocation information associated with the allocation of network resources, e.g., bandwidth, etc., to physical channels of a MU MIMO AP, hereinafter AP for clarity and brevity, e.g., AP 120, AP 122, etc. As an example, network device 110 can receive allocation information indicating the number of physical channels between network device 110 and AP 120, 122, etc., a metric of used and unused network resources on those physical channels, etc. Based on this allocation information, network device 110 can reallocate the unused bandwidth into a first logical channel. The first logical channel can comprise a plurality of physical channels, e.g., 111, 112, etc., between network device 110 and APs, e.g., 120 122, etc., that have coverage areas e.g., 131, 133, etc., able to service UE 140. The APs can then enable access to the first logical channel for a UE, e.g., via wireless links 130, 132, etc. As previously noted, this can be distinct from a UE controlling data flow across a plurality of APs via a plurality of physical channels that are not treated as a logical channel by a network device, in that the network device does not manage network Authentication, Authorization, and Accounting (AAA) in the same way for a single logical channel comprising a pieces of different physical channels as it manages AAA for channels that are both logically and physically distinct. In an aspect, the logical channel can represent bonding of portions of a plurality of access network links, 111, 112, etc., into the logical channel. As an example, a first cable internet subscriber that works from home can access a 20 MB/sec connection via a home MU MIMO Wi-Fi AP while his neighbor is away at work in the city. Where the neighbor has a similar 20 MB/sec connection via their home MU MIMO Wi-Fi AP that is unused during the day, the first cable internet subscriber could benefit from using the neighbor's connection that is otherwise going unused. A cable internet provider network device can receive information that indicates that the neighbor connection is unused and available and that the first cable internet subscriber has a UE that is in range of both the first cable internet subscriber AP and the neighbor AP. In response, the cable internet provider network device can form a logical channel that employs both the 20 MB/sec connections to communicate with the first cable internet subscriber UE at a bandwidth greater between 20 and 40 MB/sec. In this example, part of the logical channel can be the first cable internet subscriber connection via the first cable internet subscriber AP while a second part of the logical channel can be the neighbor connection via a second wireless connection from the neighbor AP to the first cable internet subscriber UE. Data can be routed by the network device accordingly. In an embodiment, the routing can be a form of multipath transmission control protocol (multipath-TCP).

System 100 can further comprise AP 120, 122, etc. In an aspect, AP 120, 122, etc., can be MU MIMO APs. A MU MIMO AP can enable concurrent data communication with a plurality of radio receivers, e.g., a plurality of devices, plurality of UEs, a UE with a plurality of radios, a UE with a plurality of radio channels, etc. As such, AP 120 and AP 122 can communicate simultaneously with UE 140, wherein UE 140 is MU MIMO enabled. Of note, this can allow AP 120 and AP 122 to act as spatially diverse transmitters which can enhance MU MIMO performance by allowing for the phased transmission to constructively interfere at the location of UE 140 and destructively interfere in other locations, e.g., signals over link 130 and 132 can interfere in a manner that makes them receivable at the location of UE 140 and not at other locations. This can be distinct from link 130 and link 132 being single user links, e.g., SU MIMO connections between an AP and UE 140.

In an embodiment, coverage area 131 of AP 120 and coverage area 133 of AP 122 both can serve data to the location of UE 140. Where the coverage areas, e.g., 131, 133, etc., do not overlap the location of UE 140, there is no possibility of a link being formed and the additional physical channel of the logical channel would have no path to UE 140, e.g., if UE 140 is out of range of the neighbor's AP in the previous example, there would be no connection to the UE and the unused bandwidth from the neighbor's cable internet connection would be unavailable to the UE. In an aspect, it can colloquially be said that neighboring APs can participate in the formation of logical channels; however, this is efficacious only where the neighboring APs have coverage areas that include the location of a UE being served.

In an embodiment, supplemental data, e.g., historical use data, etc., can be employed in predicting logical channel formation. Continuing the previous example, where the neighbor goes to work from 9-noon Monday through Friday, the logical channel can be formed only during those times. Moreover, formation of the logical channel can be restricted to first verifying that the channels are indeed in the predicted state before bonding into a logical channel occurs. As an example, where the neighbor is home ill on a Monday, then the logical channel would fail if there were channel occupation by the neighbor at 9 am on Monday.

In some embodiments, partially unused physical channels can also be harvested for logical channel formation. Again generally reusing the previous example, where the ill neighbor is only using 10% of their connection, the two physical channels can be bonded into a logical channel that is used by both MU MIMO APs, e.g., the two MU MIMO APs act as a logical spatially diverse MU MIMO AP to concurrently serve both the neighbor UE and the first cable internet subscriber UE wherein the two users share a single logical connection that has more bandwidth that either single physical connection independently. In this example, it is better to share a 40 MB/sec pipe than to have sole access to a 20 MB/sec pipe. However, where the ill neighbor and the first cable internet subscriber are both using a substantial amount of their own bandwidth, forming the logical channel and sharing the bonded connections can cause performance issues where the sum of the usage exceeds the logical channel bandwidth, in which case, it can be less desirable to form the logical channel. As an example, where the ill neighbor runs multiple bit torrent streams, the usage can reduce the bandwidth on a logical channel that would be available to the first cable internet subscriber, in which case it can be desirable by the first cable internet subscriber to simple use the physical channel he subscribes to, e.g., the 20 MB/sec connection.

In an embodiment, network device 110 can apply AAA to the use of the logical channel by UE 140 vie AP 120 and AP 122. This is distinct from other sharing solutions that share conventional access network links between APs or UEs, in which conventional sharing solutions each physical channel typically undergoes separate AAA with a connected network device. As an example, UE 140 can undergo network-provider level AAA via network device 110 once for a logical channel comprising 111, 112, 130, and 132 in the presently disclosed subject matter. In contrast, in a conventional sharing system, UE 140 would undergo network-provider level AAA to network device 110 once for the path 130/111 and again for the path 132/112. In other conformations of conventional sharing, multiple network-provider level AAA to network device 110 would also generally occur, unlike the disclosed subject matter.

Figure 2:
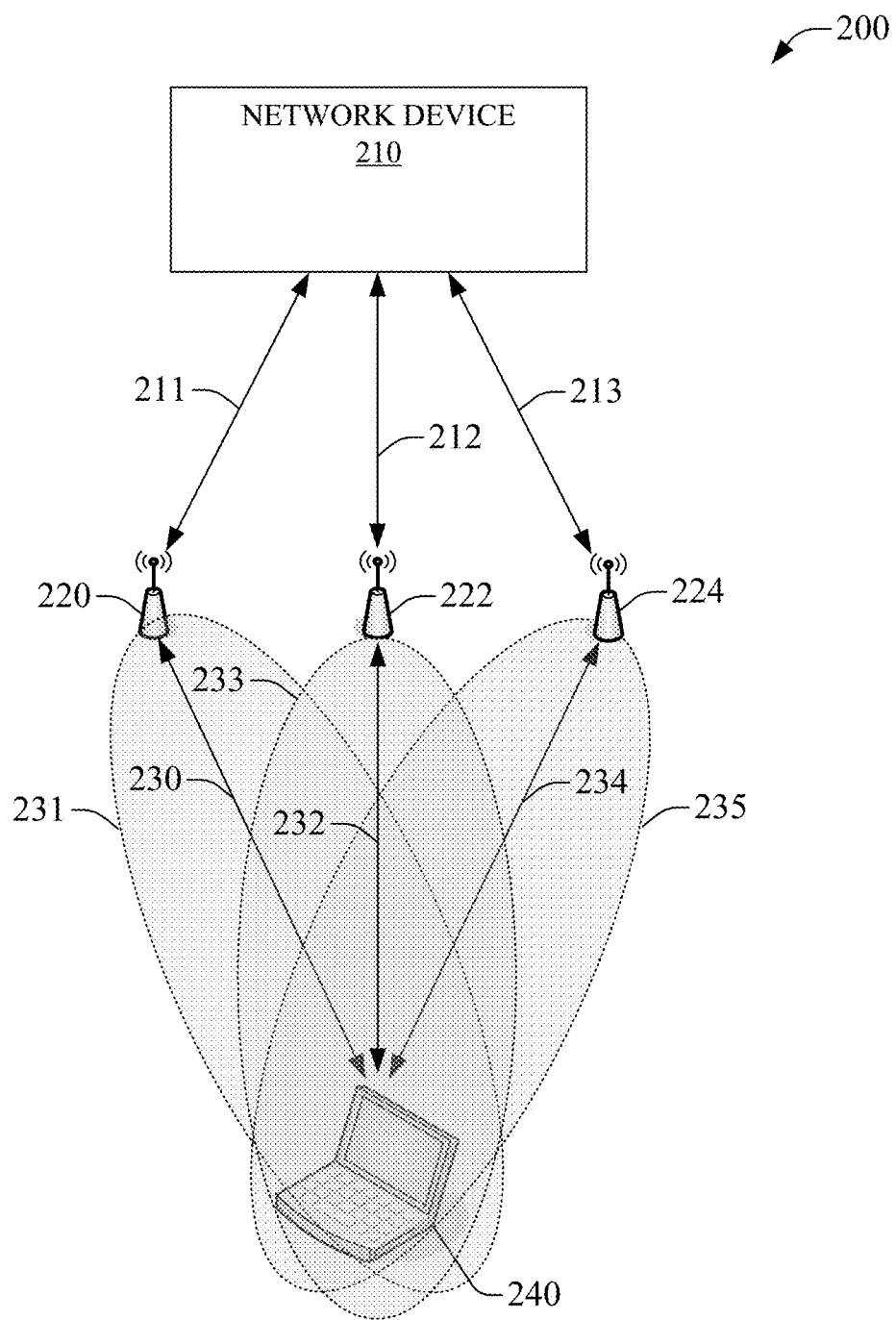
FIG. 2 is an illustration of an example system that can facilitate use of unused bandwidth via radio access resource sharing among a plurality of access points, in accordance with aspects of the subject disclosure.

FIG. 2 is an illustration of a system 200, which can facilitate use of unused bandwidth via radio access resource sharing among a plurality of access points, in accordance with aspects of the subject disclosure. System 200 can comprise network device 210. Network device 210 can be a network device of a network associated with a network operator, to control, via a control plane, the flow of data, via a service plane, through a plurality of physically distinct channels configured as one or more logical channel(s), wherein the logical channel(s) embody unused portions of previously allocated bandwidth. Network device 210 can receive allocation information associated with the allocation of network resources, e.g., bandwidth, etc., to physical channels of a MU MIMO AP, e.g., AP 220, 222, 224, etc. As an example, network device 210 can receive allocation information indicating the number of physical channels between network device 210 and AP 220, 222, 224, etc., a metric of used and unused network resources on those physical channels, etc. Based on this allocation information, network device 210 can reallocate the unused bandwidth into one or more logical channel(s). A logical channel can comprise a plurality of physical channels, e.g., 211, 212, 213, etc., between network device 210 and APs, e.g., 220 222, 224, etc., that have coverage areas e.g., 231, 233, 235, etc., able to service UE 240. The APs can then enable access to the logical channel for a UE, e.g., via wireless links 230, 232, 234, etc., in a manner that is distinct from a UE controlling data flow across a plurality of APs via a plurality of physical channels that are not treated as a logical channel by a network device, e.g., the network device does not manage network AAA in the same way for a single logical channel comprising a pieces of different physical channels as it does for channels that are both logically and physically distinct. In an aspect, the logical channel can represent bonding of portions of a plurality of access network links, 211, 212, 213, etc., into the logical channel. As an example, a user can access multiple APs located around their office. Where some of the APs have underused or unused bandwidth, the user could benefit from using the otherwise unused connections. A company gateway, e.g., network device 210, can receive information that indicates that there are unused portions of the AP connections and that the user has a UE that is in range of APs 220, 222, and 224, for example. The company gateway can form a logical channel that employs both the connections of the APs to communicate with the UE at a greater bandwidth. In this example, part of the logical channel can be from each of the AP connections. Data can be routed by the company gateway accordingly. In an embodiment, the routing can be a form of multipath-TCP.

AP 220, 222, 224, etc., of system 200, in an aspect, can be MU MIMO APs. A MU MIMO AP can enable concurrent data communication with a plurality of radio receivers. As such, AP 220-224 can communicate simultaneously with UE 240, wherein UE 240 is MU MIMO enabled. Of note, this can allow AP 220-224 to act as spatially diverse transmitters that enhance MU MIMO performance by allowing for the phased transmission of signals to constructively interfere at the location of UE 240 and destructively interfere in other locations, e.g., signals over link 230, 232, and 235, can interfere in a manner that makes them receivable at the location of UE 240 and not at other locations. In an embodiment, coverage area 231 of AP 220, coverage area 233 of AP 222, and coverage area 235 of AP 224, each can serve data to the location of UE 240.

In an embodiment, supplemental data, e.g., historical use data, etc., can be employed in predicting logical channel formation. Continuing the previous example, where the office is open from 9-5, Monday through Friday, the logical channel can be formed for UEs located within the office during those times, and can be shared with devices outside of the office at other times. Moreover, formation of the logical channel can be restricted to first verifying that the channels are indeed in the predicted state before bonding into a logical channel occurs. As an example, where the office during an evening for a company holiday party, then forming a logical channel for UEs outside the office location would fail where there is channel occupation by UEs within the company office location. In an embodiment, partially unused physical channels can be bonded into a logical channel.

In an embodiment, network device 210 can apply AAA to the use of the logical channel by UE 240 vie AP 220, AP 222, and AP 224. This is distinct from other sharing solutions sharing conventional access network links between APs or UEs, which typically applies separate AAA for each physical connection to a network device. As an example, UE 240 can undergo corporate gateway level AAA via network device 210 once for a logical channel comprising 211, 212, 213, 230, 232, and 234, under the presently disclosed subject matter. In contrast, in a conventional sharing system, UE 240 would undergo network-provider level AAA to network device 210 once for the path 230/211, again for the path 232/212, and yet again for the path 234/213. In other conformations of conventional sharing, multiple network-provider level AAA to network device 210 would also generally occur, unlike the disclosed subject matter.

Figure 3:
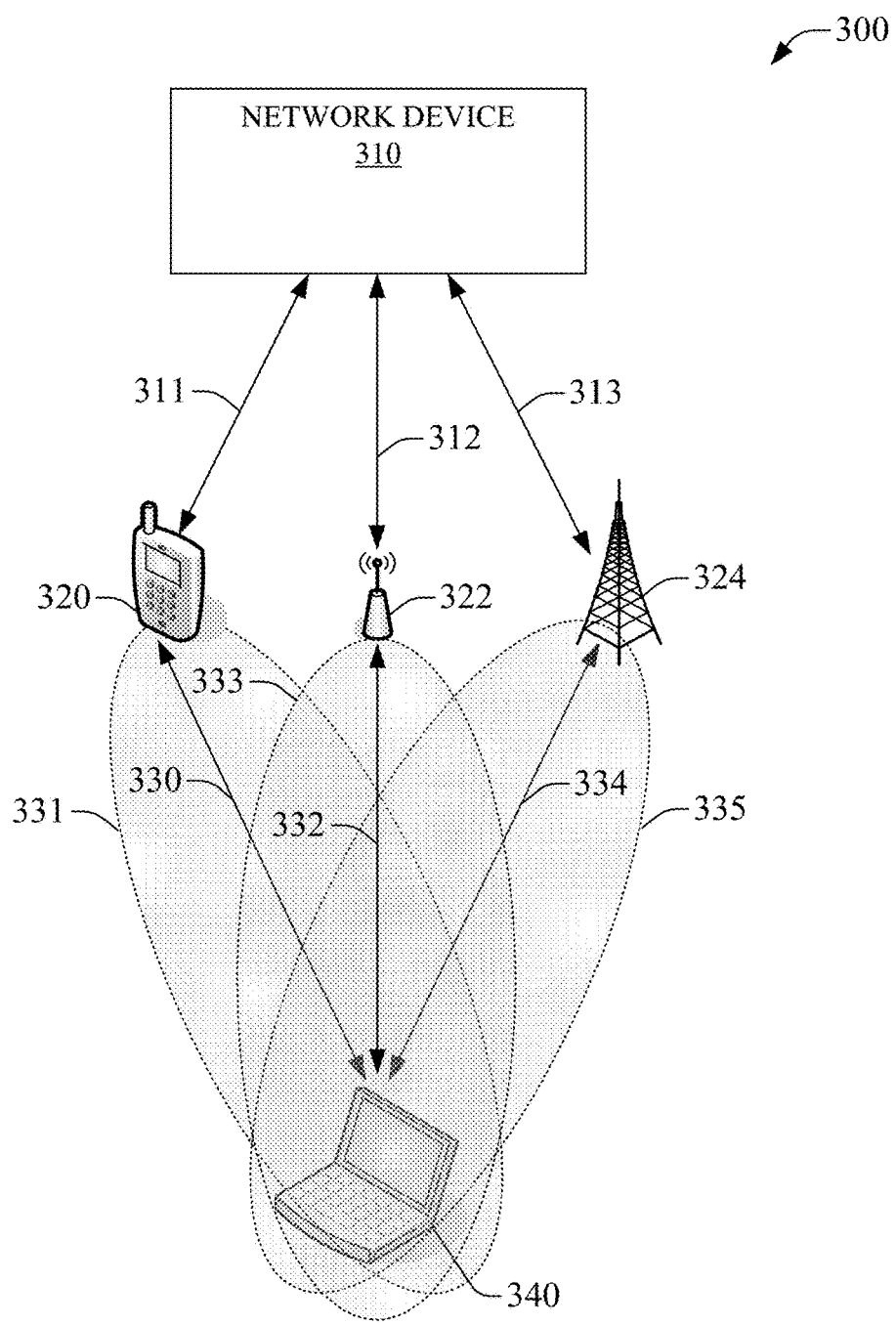
FIG. 3 is an illustration of an example system that can facilitate use of unused bandwidth via radio access resource sharing among access points employing different radio access technologies, in accordance with aspects of the subject disclosure.

FIG. 3 is an illustration of a system 300, which can facilitate use of unused bandwidth via radio access resource sharing among access points employing different radio access technologies, in accordance with aspects of the subject disclosure. System 300 can comprise network device 310. Network device 310 can be a network device of a network associated with a network operator, to control, via a control plane, the flow of data, via a service plane, through a plurality of physically distinct channels configured as one or more logical channel(s), wherein the logical channel(s) embody unused portions of previously allocated bandwidth. Network device 310 can receive allocation information associated with the allocation of network resources, e.g., bandwidth, etc., to physical channels of a MU MIMO AP, e.g., AP 320, 322, 324, etc., wherein an AP can be any device allowing access to the access network, e.g., links 311, 312, 313, etc. Network device 310, as an example, can receive allocation information indicating the number of physical channels between network device 310 and AP 320, 322, 324, etc., a metric of used and unused network resources on those physical channels, etc. Based on this allocation information, network device 310 can reallocate the unused bandwidth into one or more logical channel(s). A logical channel can comprising a plurality of access network wired or wireless channels, e.g., 311, 312, 313, etc., between network device 310 and APs, e.g., 320 322, 324, etc., that have coverage areas e.g., 331, 333, 335, etc., able to service UE 340. The APs can then enable access to the logical channel for a UE, e.g., via wireless links 330, 332, 334, etc., in a manner that is distinct from a UE controlling data flow across a plurality of APs via a plurality of access network channels that are not treated as a logical channel by a network device, e.g., the network device does not manage network AAA in the same way for a single logical channel comprising a pieces of different access network channels as it does for channels that are both logically and physically distinct. In an aspect, the logical channel can represent bonding of portions of a plurality of access network links, 311, 312, 313, etc., into the logical channel. As an example, a user can access multiple APs located near to a coffee shop. Where some of the APs have underused or unused bandwidth, the user could benefit from using the otherwise poorly utilized connections. Network device 310 can receive information that indicates that there are unused portions of the AP connections and that the user has a UE that is in range of APs 320, 322, and 324. Network device 310 can form a logical channel that employs the connections of the APs to communicate with the UE at a greater bandwidth. In this example, part of the logical channel can be from each of the AP connections. Data can be routed by network device 310 accordingly. In an embodiment, the routing can be a form of multipath-TCP.

AP 320, 322, 324, etc., of system 300, in an aspect, can be MU MIMO APs. A MU MIMO AP can enable concurrent data communication with a plurality of radio receivers. As such, APs 320-324 can communicate simultaneously with UE 340, wherein UE 340 is MU MIMO enabled. Of note, this can allow APs 320-324 to act as spatially diverse transmitters that enhance MU MIMO performance by allowing for the phased transmission of signals to constructively interfere at the location of UE 340 and destructively interfere in other locations, e.g., signals over link 330, 332, and 335, can interfere in a manner that makes them receivable at the location of UE 340 and not at other locations. In an embodiment, coverage area 331 of AP 320, coverage area 333 of AP 322, and coverage area 335 of AP 324, each can serve data to the location of UE 340.

In some embodiments, APs 320-324 can employ different radio access technologies (RATs). While the distinct RATs can fail to act as spatially diverse transmitters for the purpose of MU MIMO between different APs, the individual APs can still each employ MU MIMO to connect simultaneously between the individual AP, e.g., 320-324, and UE 340. Moreover, where any two or more of the plurality of APs 320-324 do employ the same RAT, they can act as spatially diverse transmitters to enhance MU MIMO between UE 340 and said same RAT APs, as an example, where smartphone 320 is Wi-Fi enabled and AP 322 is a Wi-Fi AP, then AP 320 and 322 can act as a spatially diverse transmitter such that link 330 and 332 interfere to allow connection to UE 340 at the location of 340 and not at other locations. Similarly, where AP 324 is a millimeter radio, AP 324 can employ MU MIMO on link 334 separate from the interference of the example Wi-Fi link 330 and Wi-Fi link 332.

In an embodiment, network device 310 can apply AAA to the use of the logical channel by UE 340 vie AP 320, AP 322, and AP 324. This is distinct from other sharing solutions sharing conventional access network links between APs or UEs, which typically applies separate AAA for each physical connection to a network device. In some embodiments, supplemental data, e.g., historical use data, etc., can be employed in predicting logical channel formation.

Figure 4:
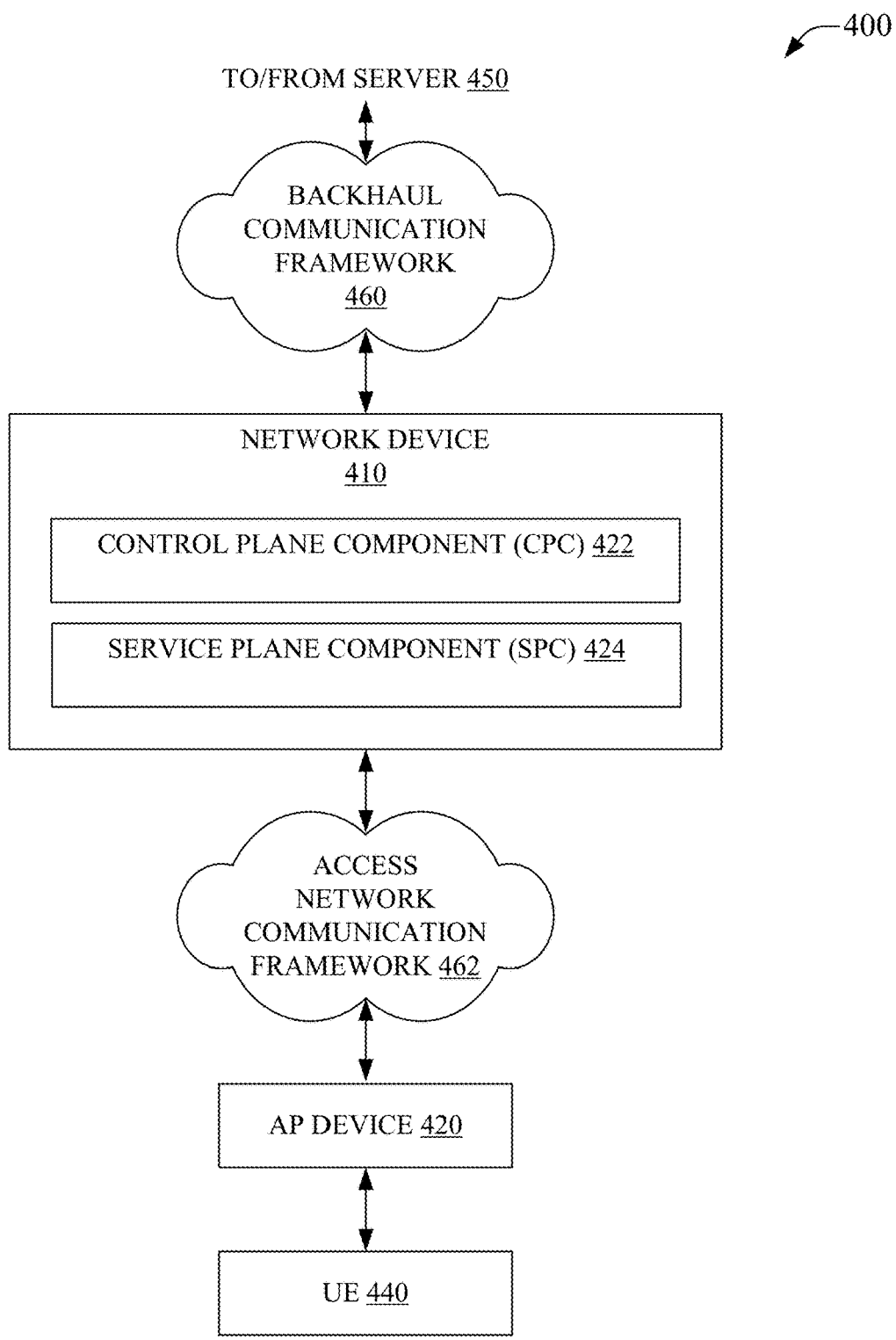
FIG. 4 is an illustration of an example system that, via a network device, can facilitate control of shared provisioning of underutilized radio access resources, in accordance with aspects of the subject disclosure.

FIG. 4 is an illustration of a system 400, which, via a network device, can facilitate control of shared provisioning of underutilized radio access resources, in accordance with aspects of the subject disclosure. System 400 can comprise network device 410. Network device 410 can be a network device of a network associated with a network operator, to control, via a control plane, the flow of data, via a service plane, through a plurality of physically distinct channels configured as a single logical channel, wherein the single logical channel embodies unused portions of previously allocated bandwidth. Network device 410 can receive allocation information associated with the allocation of network resources, e.g., bandwidth, etc., to physical channels of a MU MIMO AP, e.g., AP 420, etc. As an example, network device 410 can receive allocation information indicating the number of channels established via the access network communication framework 462 between network device 410 and AP 420, etc., a metric of used and unused network resources on those channels, etc. Based on this allocation information, network device 410 can reallocate the unused bandwidth into a logical channel. The logical channel can comprise a plurality of channels of access network communication framework 462 between network device 410 and AP 420, where AP 420 serves the location of UE 440. AP 420 can then enable access to the logical channel for UE 440. As previously noted, this can be distinct from a UE controlling data flow across a plurality of AP connections that are not treated as a logical channel by a network device, in that the network device does not manage network Authentication, Authorization, and Accounting (AAA) in the same way for a single logical channel comprising pieces of different physical channels as it manages AAA for channels that are both logically and physically distinct. In an aspect, the logical channel can represent bonding of portions of a plurality of access network links into the logical channel. As an example, AP 420 can have two or more WAN connections. Data can be routed by the network device accordingly among the several WAN connections bonded into a logical channel and serving UE 440. In an embodiment, the routing can be a form of multipath transmission control protocol (multipath-TCP). Network device 410, of system 400, can further be connected via backhaul links, e.g., backhaul communication framework 460, to enable communication to/from server 450.

In an embodiment, network device 410 can comprise control plane component (CPC) 422. CPC 422 can enable control and management of connections to AP device 420. In an aspect, CPC 422 can include connectivity management, billing, mobility management, AAA, and network routing. As an example, CPC 422 can provision, or alter provisioned, network resources between network device 410 and AP device 420 via access network communications framework 462, e.g., CPC 422 can provision resources for a plurality of WAN connections, can establish and/or provision a wireless connection to AP 420, etc. In another example, CPC 422 can manage handoff of a UE from a physical or logical connection via AP device 420 to another AP device as a UE moves locations. This example can comprise facilitating establishment of other logical channels for other network device/AP combinations so that a UE employing a logical channel of AP 420 preferably does not experience a precipitous drop in bandwidth in a mobile handover to another AP.

In an embodiment, network device 410 can comprise service plane component (SPC) 424. One or more services can be exposed to UE 440 via AP device 420 on a data plane established by SPC 424 between AP 420 and network device 410. The service plane can comprise services over the data plane that can enable messaging/signaling/control of AP device 420 via network device 410. In other aspects, the data plane can represent a logical channel comprising one or more physical wired or wireless channels between network device 410 and AP device 420.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
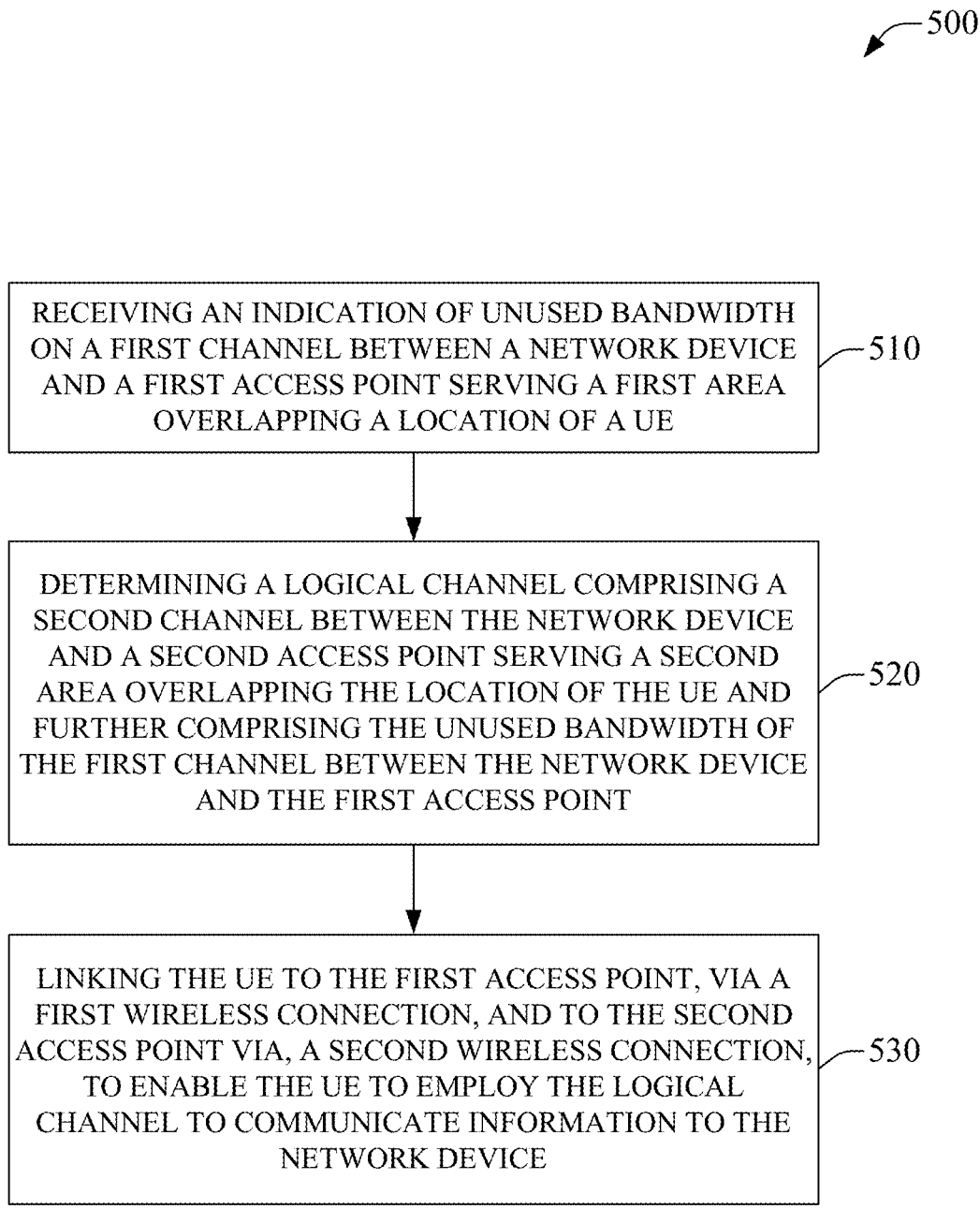
FIG. 5 illustrates an example method enabling use of unused bandwidth via radio access resource sharing among a plurality of access points, in accordance with aspects of the subject disclosure.

FIG. 5 illustrates example method 500 facilitating use of unused bandwidth via radio access resource sharing among a plurality of access points, in accordance with aspects of the subject disclosure. Method 500, at 510, can comprise receiving an indication of unused bandwidth. The unused bandwidth can be on a first channel between a network device and a first AP. The first AP can serve an area comprising a location of a UE. The network device can be a part of a network associated with a network operator that can control, via a control plane, a flow of data, via a service plane, through a plurality of physically distinct channels, e.g., distinct wired channels, wireless channels that are distinct even though they can occupy the same space at the same time (different coding, frequencies, phase, etc.), or combinations thereof. The physically distinct channels can be configured into one or more logical channels, wherein the logical channel(s) can comprise the unused bandwidth.

At 520, method 500 can comprise, determining a logical channel comprising a second channel between the network device and a second AP servicing a second area overlapping the location of the UE. The logical channel can comprise the unused bandwidth of the first channel. The network device can be connected, via the distinct physical channels, to an AP, e.g., a MU MIMO AP. The AP can be any device facilitating UE access to the access network. An AP can enable UE access to the network device on a logical channel via the AP. In an aspect, the logical channel can represent bonding of portions of a plurality of access network links into the logical channel. As an example, a user can access multiple APs located near to a coffee shop. Where some of the APs have underused or unused bandwidth, the user can benefit from using the otherwise poorly utilized connections. A network device can receive information that indicates that there are unused portions of the AP connections and that the user has a UE that is in range of the corresponding APs. The network device can form a logical channel that employs the connections of the APs to communicate with the UE at a greater bandwidth. Data can be routed by the network device accordingly. In an embodiment, the routing can be a form of multipath-TCP.

At 530, method 500 can comprise, linking the UE to the first AP via the first wireless connection, and to the second AP, via the second wireless connection. This can enable the UE to access the full bandwidth of the logical channel, which can be greater than the bandwidth of a constituent physical channel. At this point method 500 can end.

Figure 6:
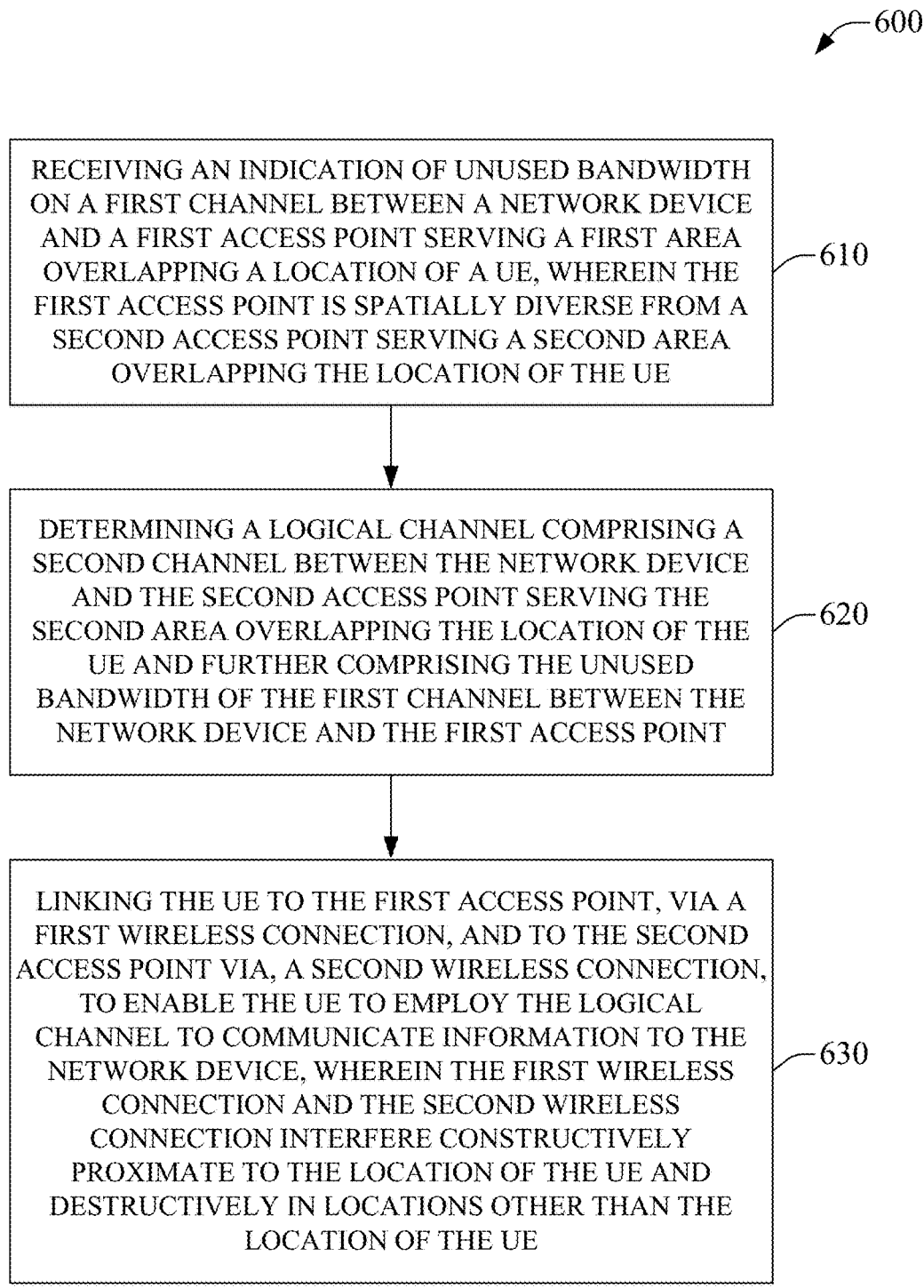
FIG. 6 illustrates an example method facilitating use of unused bandwidth via radio access resource sharing among access points employing different radio access technologies, in accordance with aspects of the subject disclosure.

FIG. 6 illustrates example method 600 enabling use of unused bandwidth via radio access resource sharing among access points employing different radio access technologies, in accordance with aspects of the subject disclosure. Method 600, at 610, can comprise receiving an indication of unused bandwidth. The unused bandwidth can be on a first channel between a network device and a first AP. The first AP can serve an area comprising a location of a UE. The first access point can be spatially diverse from a second AP. The second AP can serve a second area also overlapping the location of the UE. The network device can be a part of a network associated with a network operator that can control, via a control plane, a flow of data, via a service plane, through a plurality of physically distinct channels. The physically distinct channels can be configured into one or more logical channels, wherein the logical channel(s) can comprise the unused bandwidth.

At 620, method 600 can comprise, determining a logical channel comprising a second channel between the network device and the second AP. The logical channel can comprise the unused bandwidth of the first channel. The network device can connect, via the distinct physical channels, to an AP, e.g., a MU MIMO AP. The AP can be any device facilitating UE access to the access network. In an aspect, the logical channel can represent bonding of portions of a plurality of access network links into the logical channel. The network device can form the logical channel to employ the physical connections with the APs to communicate with the UE at a greater bandwidth. Data can be routed by the network device accordingly. In an embodiment, the routing can be a form of multipath-TCP.

At 630, method 600 can comprise, linking the UE to the first AP via the first wireless connection, and to the second AP, via the second wireless connection. The first and the second wireless connections can interfere constructively proximate to a location of the UE and destructively at other locations. At this point method 600 can end. In an embodiment, the first wireless connection and the second wireless connection can behave as a logically spatially diverse MU MIMO AP, to enhance MU MIMO performance. Where the transmissions from the first and second AP are phased, based on being a logical MU MIMO AP with spatial diversity, the transmission can interfere to enhance a signal at determined locations, e.g., a location of the UE. As such, the use of two physically separated APs can behave as a logical single AP with spatial diversity to facilitate concurrent transmissions to the UE using the bandwidth of the physical channels of the APs. Colloquially, the APs can be merged into a logical AP such that the physical channels of the APs can be bonded into a logical channel that can serve a UE with enhanced MU MIMO performance due to the spatial diversity of the constituent APs of the logical AP.

Figure 7:
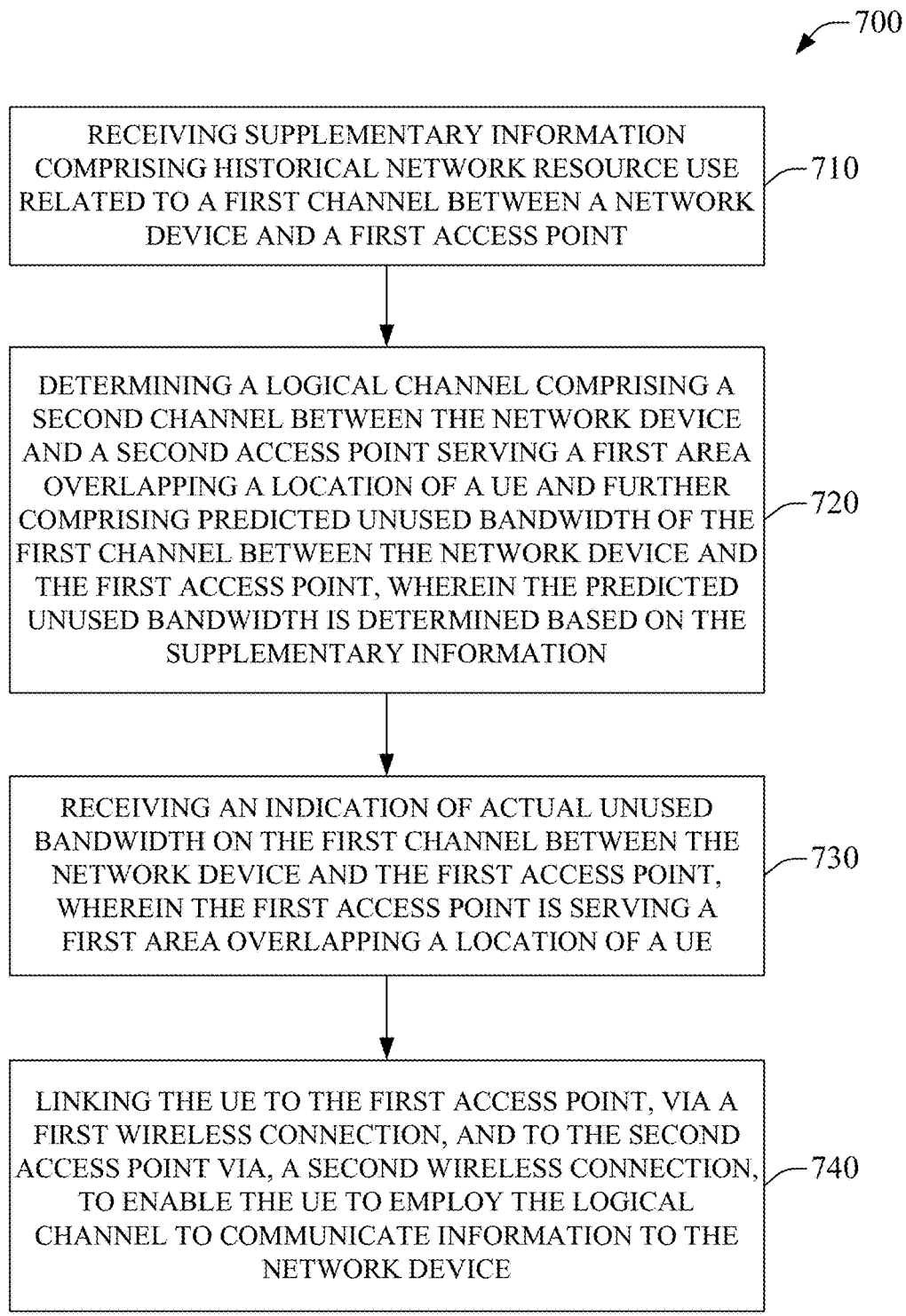
FIG. 7 illustrates an example method facilitating network device control of shared provisioning of underutilized radio access resources, in accordance with aspects of the subject disclosure.

FIG. 7 illustrates example method 700 that facilitates network device control of shared provisioning of underutilized radio access resources, in accordance with aspects of the subject disclosure. Method 700, at 710, can comprise receiving supplementary information. Supplementary information can comprise historical network resource use, wherein the historical network resource us is related to a first channel between a network device and a first AP. As examples, supplementary information can be historical bandwidth consumption, historical bandwidth utilization, historical user equipment behaviors, etc.

At 720, method 700 can comprise determining a logical channel comprising a second channel between the network device and a second AP servicing a first area comprising a location of a UE. The logical channel can comprise a predicted unused bandwidth of the first channel. The predicted unused bandwidth can be determined based on the supplementary information received at 710. The network device can be connected, via distinct physical channels, to an AP, e.g., a MU MIMO AP. The network device can be a part of a network associated with a network operator that can control, via a control plane, a flow of data, via a service plane, through a plurality of physically distinct channels, e.g., distinct wired channels, wireless channels that are distinct even though they can occupy the same space at the same time (different coding, frequencies, phase, etc.), or combinations thereof. The physically distinct channels can be configured into one or more logical channels, wherein the logical channel(s) can comprise the unused bandwidth. An AP can be any device facilitating UE access to the access network. An AP can enable UE access to the network device on a logical channel via the AP. In an aspect, the logical channel can represent bonding of portions of a plurality of access network links into the logical channel. Data can be routed by the network device accordingly. In an embodiment, the routing can be a form of multipath-TCP.

At 730, method 700 can comprise receiving an indication of unused bandwidth on the first channel between the network device and the first AP. The first AP can serve another area comprising the location of the UE. The indication of unused bandwidth on the first channel, in an aspect, can confirm the prediction of unused bandwidth made at 720. Where there is not unused bandwidth that comports with the prediction, method 700 can end. However, where the unused bandwidth at 730 indicates that the predicted logical channel is appropriate, method 700 can continue. Verifying the prediction against actual use can reduce the likelihood that a subscriber will experience loss of bandwidth in favor of sharing said bandwidth with another subscriber.

At 740, method 700 can comprise linking the UE to the first AP via the first wireless connection, and to the second AP, via the second wireless connection. This can enable the UE to access the full bandwidth of the logical channel, which can be greater than the bandwidth of a constituent physical channel. At this point method 700 can end.

Figure 8:
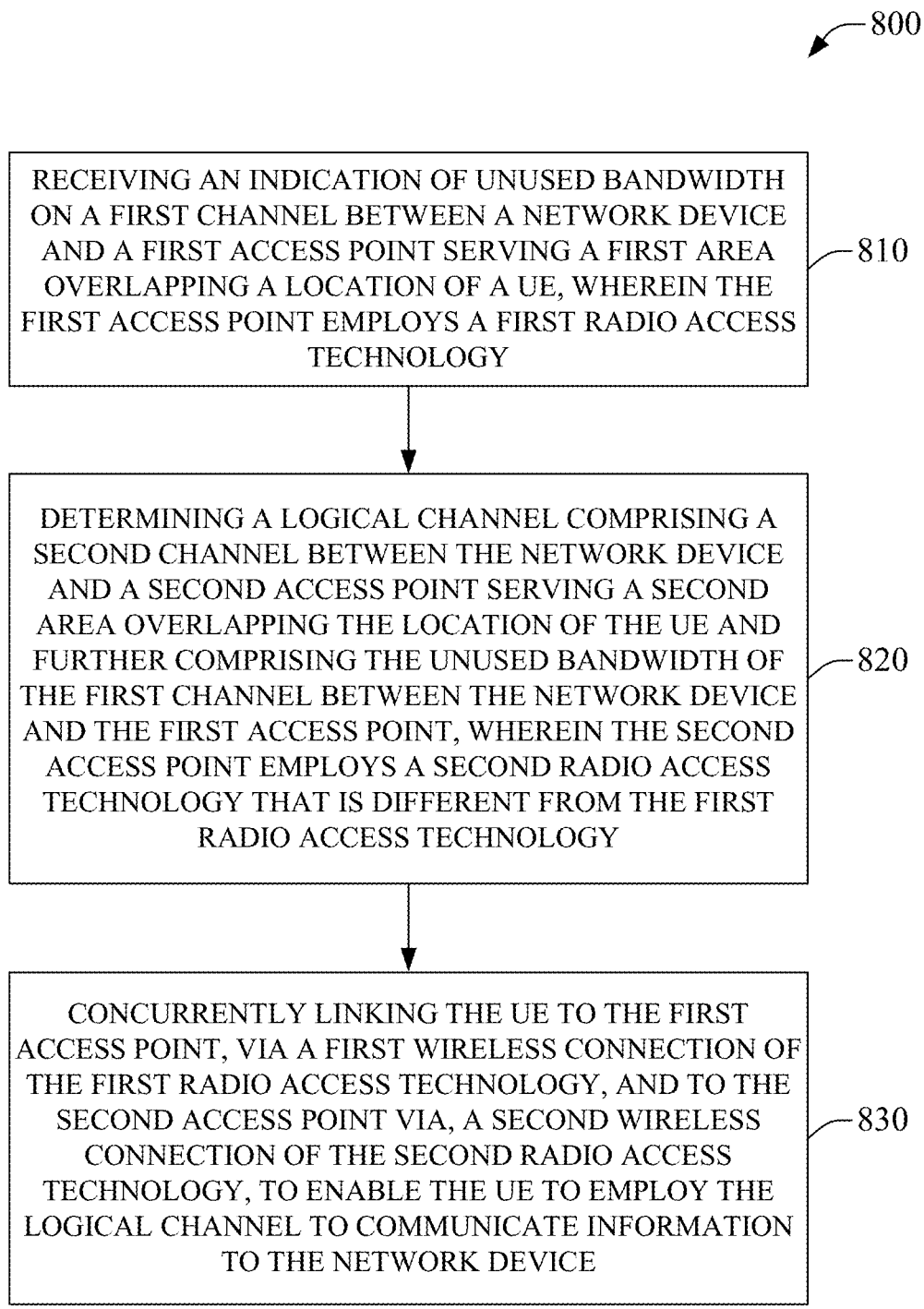
FIG. 8 illustrates an example method enabling shared provisioning of underutilized radio access resources based on predicted bandwidth consumption, in accordance with aspects of the subject disclosure.

FIG. 8 illustrates example method 800 facilitating shared provisioning of underutilized radio access resources based on predicted bandwidth consumption, in accordance with aspects of the subject disclosure. Method 800, at 810, can comprise can comprise receiving an indication of unused bandwidth. The unused bandwidth can be on a first channel between a network device and a first AP. The first AP can serve an area comprising a location of a UE. The first AP can employ a first RAT. The network device can be a part of a network associated with a network operator that can control, via a control plane, a flow of data, via a service plane, through a plurality of physically distinct channels, e.g., distinct wired channels, wireless channels that are distinct even though they can occupy the same space at the same time (different coding, frequencies, phase, etc.), or combinations thereof. The physically distinct channels can be configured into one or more logical channels, wherein the logical channel(s) can comprise the unused bandwidth.

At 820, method 800 can comprise, determining a logical channel comprising a second channel between the network device and a second AP servicing a second area overlapping the location of the UE. The second AP can employ a second RAT. The second RAT can be different from the first RAT. The logical channel can comprise the unused bandwidth of the first channel. The network device can be connected, via the distinct physical channels, to an AP, e.g., a MU MIMO AP. The AP can be any device facilitating UE access to the access network. An AP can enable UE access to the network device on a logical channel via the AP. In an aspect, the logical channel can represent bonding of portions of a plurality of access network links into the logical channel. Data can be routed by the network device accordingly. In an embodiment, the routing can be a form of multipath-TCP.

At 830, method 800 can comprise, linking the UE to the first AP via the first wireless connection employing the first RAT, and to the second AP, via the second wireless connection employing the second RAT. At this point method 800 can end. The use of different RATs can enable the UE concurrently to access the bandwidth of each physical channel via a different RAT while access is still treated as a single logical channel, which can enable the network device to perform AAA, routing functions (multipath-TCP), mobility functions, etc., in a manner distinct from conventional sharing technologies.

Figure 9:
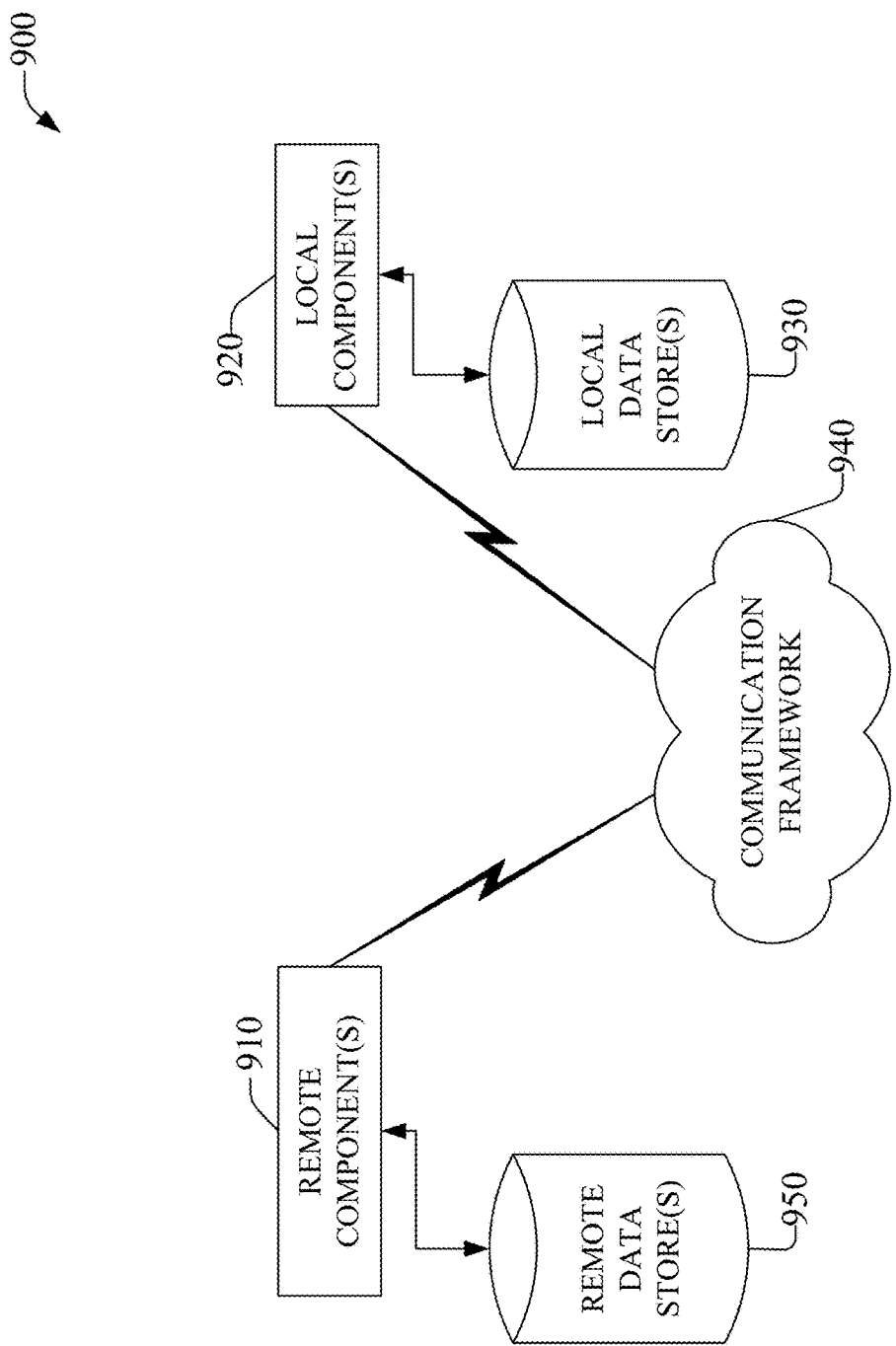
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise femtocell(s), picocell(s), access point(s), RAN device(s), NodeB(s), eNodeB(s), UE(s), personal computing device(s), wearable device(s), etc. As an example, remote component(s) 910 can be AP 120, 122, 220, 222, 224, 320, 322, 324, 420, etc.

The system 900 also comprises one or more local component(s) 920. The local component(s) 920 can be hardware and/or software (e.g., threads, processes, computing devices). In some embodiments, local component(s) 920 can comprise servers, personal servers, wireless telecommunication core-network devices, etc., for example, server 450, network device 110, 210, 310, 410, etc. Network device 110, 210, 310, 410, etc., can be comprised in a network provider core-network device, such as a GGSN, DSLAM, HLR, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, historical use data, supplementary data, predictive logical channel information, etc., can be stored on remote data store(s) that can be comprised in or connected to network device 110, 210, 310, 410, etc.

Figure 10:
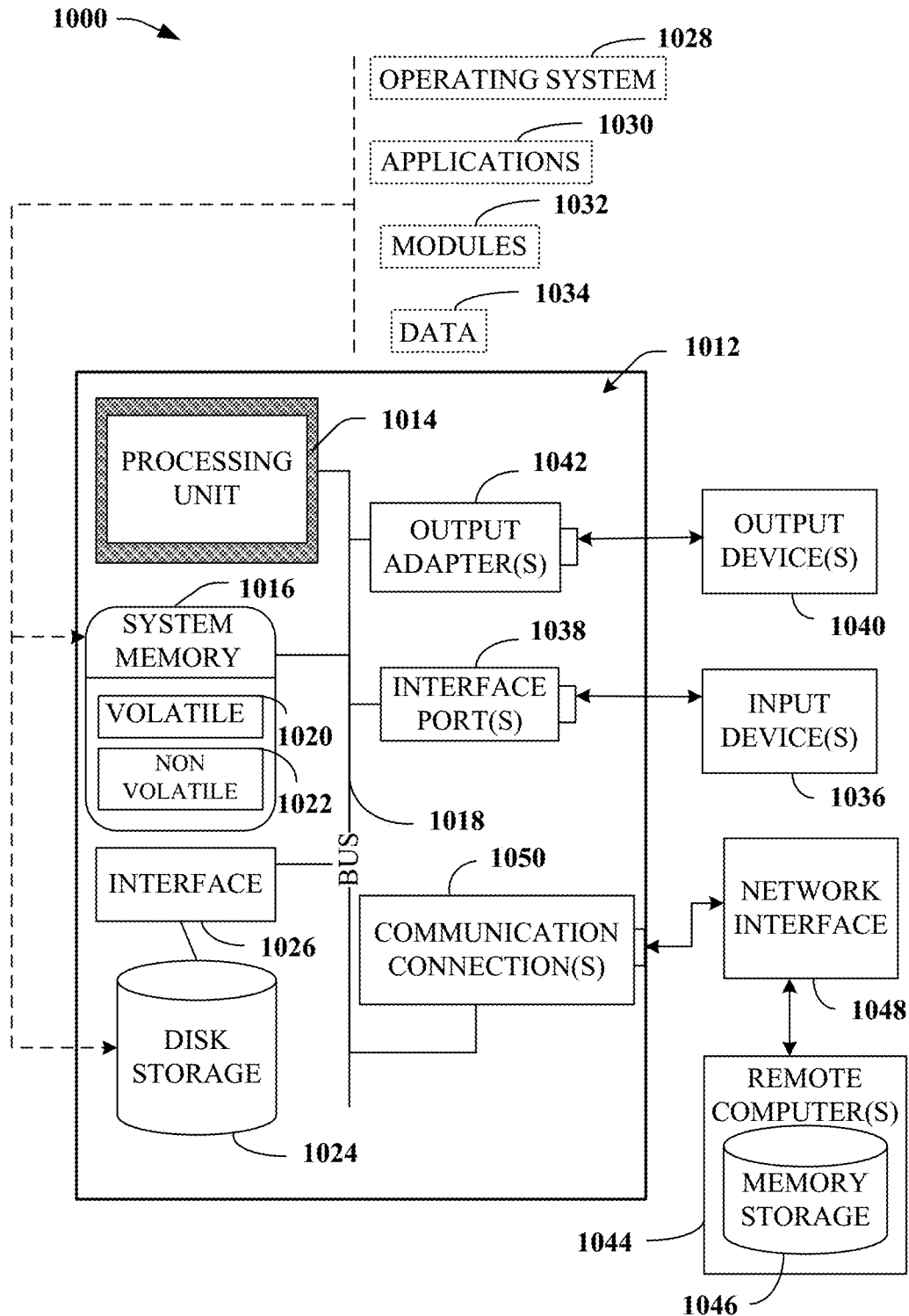
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, network device 110, 210, 310, 410, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining, by a network device (110, 210,310, 410, etc.), a logical channel, such as based on historical network resource use (710, etc.), to share predicted unused bandwidth from an underutilized physical channel with a UE.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., an first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining a first access point device comprising a first access network connection between the first access point device and a first network device, wherein a first allocation of bandwidth of the first access network connection is allocated to a first subscriber; and
      in response to determining a first unused portion of the first allocation of bandwidth:
         determining a second channel comprising a second access point device comprising a second access network connection between the second access point device and a second network device, wherein the second access network connection is different from the first access network connection, and wherein a second allocation of bandwidth of the second access network connection is allocated to a second subscriber;

forming a logical channel comprising at least some of the first unused portion of the first allocation of bandwidth of the first access network connection and the second allocation of bandwidth of the second access network connection; and instructing the first access point device to route a first portion of data traffic with a user equipment associated with the second subscriber via the logical channel employing the first access network connection of the first access point device, and instructing the second access point device to route, concurrently with the first portion of data being routed, a second portion of the data traffic with the user equipment via the logical channel employing the second access network connection of the second access point device.

2. The system of claim 1, wherein the first network device and the second network device are a same network device.

3. The system of claim 1, wherein the first access network connection comprises a wired connection.

4. The system of claim 1, wherein the first access network connection comprises a wireless connection.

5. The system of claim 1, wherein the first access point device employs a first radio access technology to serve a first area and the second access point device employs a second radio access technology to serve a second area.

6. The system of claim 5, wherein the first area and the second area comprise a location of the user equipment.

7. The system of claim 5, wherein the first radio access technology and the second radio access technology are a same radio access technology.

8. The system of claim 7, wherein a first transmission from the first access point interferes constructively and destructively with a concurrent second transmission from the second access point to increase reception of the interfering signal at a determined user equipment location and decrease reception of the interfering signal at locations other than the determined user equipment location.

9. The system of claim 5, wherein the first radio access technology and the second radio access technology are different radio access technologies.

10. The system of claim 5, wherein the first radio access technology causes the first access point device to operate in a millimeter wavelength frequency spectrum.

11. The system of claim 1, wherein the forming the logical channel comprises determining a predicted logical channel based on supplementary data comprising historical network resource use data.

12. The system of claim 11, wherein the instructing the first access point device to route a first portion of data traffic occurs in response to an actual use of the first access network connection being determined to satisfy a rule related to a usage parameter of the predicted logical channel.

13. A method, comprising:

receiving, by a system comprising a processor, unused network resource information for a first physical channel between a network device and a first multiple-user multiple-input-multiple-output access point device, wherein the unused network resource information relates to a first allocation of bandwidth of the first physical channel that is allocated to a first entity; and in response to determining that the unused network resource information indicates there is a first unused portion of the first allocation of bandwidth:

designating, by the system, a logical channel comprising at least some of the first unused portion of the first allocation of bandwidth of the first physical channel and a second allocation of bandwidth of a second physical channel that is allocated to a second entity, wherein the second physical channel is between the network device and a second multiple-user multiple-input-multiple-output access point device; and routing, by the system, a first portion of data traffic associated with a user equipment of the second entity via the logical channel employing the first physical channel of the first multiple-user multiple-input-multiple-output access point device, and concurrently routing a second portion of the data traffic associated with the user equipment via the logical channel employing the second physical channel of the second multiple-user multiple-input-multiple-output access point device.

14. The method of claim 13, wherein:

the routing the first portion of the data traffic comprises transmitting the first portion of the data traffic via a first wireless link employing a first radio access technology, and the routing the second portion of the data traffic comprises transmitting the second portion of the data traffic via a second wireless link employing a second radio access technology.

15. The method of claim 14, wherein the first radio access technology and the second radio access technology are a same radio access technology.

16. The method of claim 15, wherein the transmitting the first portion of the data traffic via the first wireless link and the transmitting the second portion of the data traffic via the second wireless link occurs concurrently and results in interference that increases a signal strength of the logical channel at a location of the user equipment.

17. The method of claim 14, wherein the first radio access technology and the second radio access technology are different radio access technologies.

18. A non-transitory machine-readable storage medium, comprising executable instructions that, when executed by a processor, facilitate performance of operations, comprising:

receiving unused network resource information for a first physical channel between a first network device and a first multiple-user multiple-input-multiple-output access point device, wherein the unused network resource information relates to a first allocation of bandwidth of the first physical channel that is allocated to a first user; and in response to determining that the unused network resource information indicates a first unused portion of the first allocation of bandwidth:

designating a logical channel comprising at least some of the first unused portion of the first allocation of bandwidth of the first physical channel and second allocation of bandwidth of a second physical channel that is allocated to a second user, wherein the second physical channel is between a second network device and a second multiple-user multiple-input-multiple-output access point device; and routing a first portion of data traffic associated with a user equipment of the second user via the logical channel employing the first physical channel of the first multiple-user multiple-input-multiple-output access point device, and concurrently routing a second portion of the data traffic associated with the user equipment via the logical channel employing the second physical channel of the second multiple-user multiple-input-multiple-output access point device.

19. The non-transitory machine-readable storage medium of claim 18, wherein the first network device and the second network device are a same network device.

20. The non-transitory machine-readable storage medium of claim 18, wherein the routing the first portion of the data traffic is via a first wireless link, wherein the routing the second portion of the data traffic is via a second wireless link, wherein the routing the second portion occurs concurrently with the routing of the first portion, and wherein the routing the first portion and the routing the second portion results in a transmission interference that increases a signal strength of the logical channel at a location of the user equipment.

* * * * *